United States Patent
Muth

(10) Patent No.: US 9,782,854 B2
(45) Date of Patent: Oct. 10, 2017

(54) DEVICE FOR ATTACHING CORRECTIVE WEIGHTS BY ELECTRIC RESISTANCE PRESSURE WELDING

(71) Applicant: Schenck RoTec GmbH, Darmstadt (DE)

(72) Inventor: Christian Muth, Fischbachtal (DE)

(73) Assignee: Schenck RoTec GmbH, Darmstadt (DE)

( * ) Notice: Subject to any disclaimer, the term of this patent is extended or adjusted under 35 U.S.C. 154(b) by 256 days.

(21) Appl. No.: 14/635,137

(22) Filed: Mar. 2, 2015

(65) Prior Publication Data

US 2015/0258623 A1    Sep. 17, 2015

(30) Foreign Application Priority Data

Mar. 12, 2014    (DE) .................. 10 2014 103 297

(51) Int. Cl.
| | |
|---|---|
| B23K 11/14 | (2006.01) |
| B23K 11/30 | (2006.01) |
| F16F 15/32 | (2006.01) |
| B23K 11/00 | (2006.01) |

(52) U.S. Cl.
CPC ............ B23K 11/14 (2013.01); B23K 11/004 (2013.01); B23K 11/3009 (2013.01); F16F 15/322 (2013.01)

(58) Field of Classification Search
CPC ..... B23K 11/14; B23K 11/3009; B23K 11/15; B23K 11/11; F16F 15/32; F16F 15/322
See application file for complete search history.

(56) References Cited

U.S. PATENT DOCUMENTS

| | | | |
|---|---|---|---|
| 3,487,192 A | 12/1969 | Hill | |
| 7,249,508 B2 | 7/2007 | Rogalla et al. | |
| 2005/0252349 A1 | 11/2005 | Rogallia et al. | |

FOREIGN PATENT DOCUMENTS

| | | |
|---|---|---|
| CN | 203316904 U | 12/2013 |
| DE | 695 030 A | 8/1940 |
| DE | 1 094 896 A | 12/1960 |
| DE | 1 952 702 A1 | 4/1970 |

(Continued)

OTHER PUBLICATIONS

Machine Translation—Weber, DD 235 584 performed Jan. 10, 2017.*
GB Search Report dated Apr. 29, 2015 in GB Application No. 1504149.4, total of 5 pages.

*Primary Examiner* — Brian Jennison
(74) *Attorney, Agent, or Firm* — Collard & Roe, P.C.

(57) ABSTRACT

Disclosed is a device for attaching corrective weights to a cylindrical outer surface of a rotor by means of electric resistance pressure welding, including an electrode (1) having a contact surface (20) for application against the rotor and comprising a supporting body (2) and a swinging body (6) having oppositely facing, congruent, spherical bearing surfaces (5, 8) suitable for abutting engagement with each other. The swinging body (6) is movably secured to the supporting body (2) such as to be able to perform limited swinging movements to all sides. A spring (14) arranged between the supporting body (2) and the swinging body (6) enables a gap to be produced between the spherical bearing surfaces (5, 8), whereby the contact surface (20) is in a position to align itself relative to the opposite surface of the rotor prior to pressure application by the welding force.

10 Claims, 1 Drawing Sheet

(56) References Cited

FOREIGN PATENT DOCUMENTS

| | | |
|---|---|---|
| DE | 3434746 A1 | 3/1986 |
| DE | 235 584 A1 | 5/1986 |
| EP | 1 520 161 B1 | 9/2007 |
| GB | 2505300 A | 2/2014 |
| SU | 848 214 A1 | 7/1981 |
| WO | 2010/054999 A1 | 5/2010 |
| WO | 2014/148341 A1 | 9/2014 |

\* cited by examiner

DEVICE FOR ATTACHING CORRECTIVE WEIGHTS BY ELECTRIC RESISTANCE PRESSURE WELDING

CROSS REFERENCE TO RELATED APPLICATIONS

Applicants claim priority under 35 U.S.C. §119 of German Application No. 10 2014 103 297.7 filed Mar. 12, 2014.

FIELD OF THE INVENTION

This invention relates to a device for attaching corrective weights to a cylindrical outer surface of a rotor, in particular a propeller shaft or drive shaft, by means of the electric resistance pressure welding method, using a holding electrode receiving a corrective weight and a counter-electrode having a contact surface for application against the rotor.

BACKGROUND OF THE INVENTION

A device of the type referred to is known from EP 1 520 161 B1 and includes a clamp-type fixture having two clamping units which are floating-mounted relative to one another in the in-feed direction and movable relative to one another by means of a feed unit to increase or reduce their relative distance. The lower clamping unit includes holding electrodes for receiving corrective weights formed from sheet metal pieces, and the upper clamping unit includes counter-electrodes lying opposite the holding electrodes and having plane contact surfaces. For welding on a corrective weight, the upper clamping unit carrying the counter-electrode is moved towards the rotor. This is followed by an in-feed movement of the lower clamping unit, with the upper clamping unit serving as backing run. The corrective weight resting in its holding electrode is pressed against the rotor circumference from below and attached to the rotor by connecting the electrodes to a source of welding current.

Moreover, DD 235 584 A1 discloses a device for projection welding cup-shaped workpieces, which enables components to be welded to cup-shaped workpieces radially from inside. A component provided with two welding projections is carried in a holding electrode, and the cup-shaped workpiece is moved to a location above the component and aligned. In this arrangement, the holding electrode is attached to a swinging electrode carried on rollers in a spring-mounted guide frame. The guide frame is guided on an arm extension mounting at the same time a contact electrode making engagement with the swinging electrode with the device in operation. In addition, the arm extension is urged in the direction of effect against an upper electrode by means of a spring biased by an adjusting screw.

In the welding of corrective weights by means of a device of the type referred to, a variety of problems may occur. In the area of the counter-electrode resting against the rotor, the rotor may experience inadmissible deformations caused by the pressing force and the effect of the welding current, and the counter-electrode may be subject to premature wear requiring its frequent replacement. When corrective weights provided with several welding projections are welded on, it may happen that the welding current is unevenly distributed in the individual welding projections, possibly resulting in the corrective weight being insufficiently anchored to the rotor.

SUMMARY OF THE INVENTION

It is an object of the present invention to provide a device of the type initially referred to which improves the welding of corrective weights to rotors in such fashion as to ensure reliable attachment of the corrective weights. Still further, it is an object of the present invention to avoid damage to the rotor by the supply of current to the counter-electrode and to prolong the useful life of the counter-electrode. Replacement of a worn contact surface on the counter-electrode should be possible in a straightforward and economical manner.

According to the present invention, this object is accomplished by a device device for attaching corrective weights to a cylindrical outer surface of a rotor by means of electric resistance pressure welding using a holding electrode receiving a corrective weight and a counter-electrode having a contact surface for application against the rotor, said counter-electrode and/or said holding electrode include a supporting body and a swinging body having oppositely facing, congruent, spherical bearing surfaces suitable for abutting engagement with each other, with the swinging body being movably secured to the supporting body by a holding element such as to be able to perform limited swinging movements to all sides, with a spring arranged between the supporting body and the swinging body making it possible for the swinging body to be unseated from the supporting body to produce a gap between the spherical bearing surfaces, and with the swinging body having on the side facing away from the spherical bearing surface the contact surface for contact with the corrective weight or with the cylindrical outer surface of the rotor.

The device of the invention affords the advantage of enabling the contact surface of the counter-electrode and the corrective weight to align themselves on the respective opposite surface of the rotor by the action of a relatively low spring pressing force prior to pressure application by the welding force, thereby resulting in uniform engagement of the contact surface of the counter-electrode and the corrective weight with the outer surface of the rotor. It is only after alignment that the respective gap is closed and the spherical bearing surfaces of swinging body and supporting body are moved into relative engagement, with the aligned position of the respective swinging body and the uniform engagement of the contact surface and the corrective weight being maintained. In the subsequent welding operation the pressing force and the welding current are thus transmitted to the rotor uniformly on the contact surface of the counter-electrode and the corrective element, thereby causing the corrective element to be welded on reliably and avoiding local overheating and deformations of the rotor in the area of the counter-electrode. The uniform engagement with the rotor prevents spark erosion of the contact surface and prolongs the useful life.

In a preferred embodiment of the device, the spherical bearing surfaces on the supporting body and on the swinging body are formed by a ball socket and, respectively, a spherical cap. The advantage of this configuration is that it enables the swinging body to be formed in the shape of a relatively flat disk, with the convex shape of the spherical cap and a concave shape of the contact surface complementing each other in forming a compact swinging body. For formation of the counter-electrode it is thus advantageous for the contact surface of the swinging body to be formed by wall surfaces of a wedge-shaped groove, with the contact surface defining two linear contact sites on the cylindrical surface of the rotor. Advantageously, the contact surface of the swinging body of the holding electrode may be formed by a cylindrical hollow surface with a curvature that matches the curvature of the corrective weight.

According to another proposal of the invention, the swinging body may include a central stepped bore radial relative to the spherical bearing surface and having a shoulder facing the contact surface, with the holding element being a countersunk screw extending through the stepped bore with radial clearance all-around and enabling the shoulder to bear against its head. This configuration affords ease of attachment of the swinging body with access from outside, so that the swinging body is replaceable easily when its contact surface is worn down. The countersunk screw may also be used to adjust the gap between the bearing surfaces by threading the countersunk screw for a greater or lesser depth into the tapped hole in the supporting body.

Moreover, it is advantageous for the countersunk screw to extend through an enlarged bore portion in the supporting body which adjoins the tapped hole and accommodates a compression spring surrounding the countersunk screw, its spring force enabling the swinging body to be unseated from the supporting body and to be urged against the head of the countersunk screw. This further development, which affords great ease of manufacture, provides a centrally located seat for the spring designed to produce the gap. The countersunk screw provides an adequate guiding function for the compression spring, and the central position of the compression spring is conducive to precise alignment relative to the rotor when the swinging body is moved into contact with the rotor.

In order to ensure an appropriate pre-alignment of the contact surfaces of the swinging body relative to the axis of the rotor, according to the invention the supporting body may include a locating pin which is spaced from the countersunk screw and engages in a locating bore in the swinging body with allowance for radial play. As a result of this positioning, the swinging body, prior to its contact with the rotor, is already in a position that enables accurate alignment relative to the rotor and requires no major position changes of the swinging body.

A device for welding corrective weights to propeller shafts, for example, may also be equipped with a plurality of holding electrodes juxtaposed in a direction tangential to the rotor and a corresponding number of oppositely facing counter-electrodes. For such applications, another proposal of the invention may provide for the supporting body to be constructed as a rail which includes a plurality of ball sockets arranged one behind the other in longitudinal direction for movably receiving swinging bodies.

BRIEF DESCRIPTION OF THE DRAWINGS

The present invention will be explained in more detail in the following with reference to an embodiment illustrated in the accompanying drawing wherein.

DETAILED DESCRIPTION OF THE DRAWINGS

Figure 1:
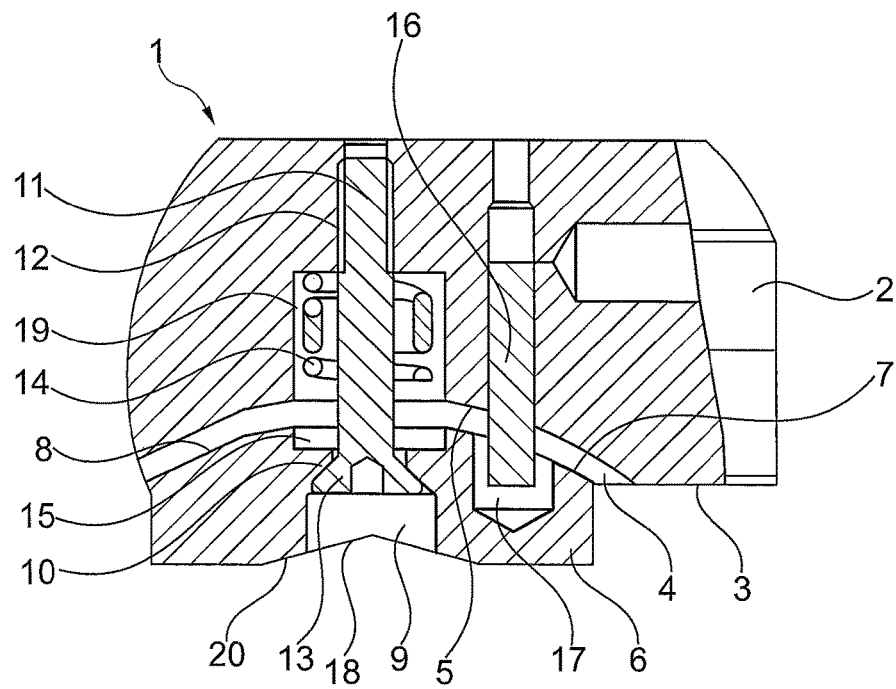
FIG. 1 is a cross-sectional view of a counter-electrode of the invention.

The counter-electrode 1 illustrated in FIG. 1 is intended for use with a clamp-type welding device of the type described in EP 1 520 161 B1, in which the electric resistance pressure welding technique is used to attach corrective weights to a rotor, in particular, to a propeller shaft or drive shaft. Situated in the welding device diametrically opposite the counter-electrode in respect of the axis of the rotor is a holding electrode accommodating therein the corrective weight. The counter-electrode shown comprises a rod-shaped supporting body 2 intended for attachment to a clamping arm of the welding device. On the side 3 close to the rotor, the supporting body 2 includes a ball socket 4 having a spherical bearing surface 5. Extending into the ball socket 4 is a swinging body 6 having a spherical cap 7 which includes a spherical bearing surface 8 congruent with the bearing surface 5. The swinging body 6 is shaped substantially in the form of a disk and includes a central stepped bore 9 with a conical shoulder 10. The swinging body 6 is secured to the supporting body 2 by means of a countersunk screw 11 which is threaded into a tapped hole 12 in the supporting body 2 and forms with its conical head 13 an abutment for the shoulder 10.

The shank of the countersunk screw 11 has an outer diameter smaller than the smallest diameter of the stepped bore 9, thereby producing between the swinging body 6 and the shank of the countersunk screw 11 an annular clearance space which allows radial position changes of the swinging body 6 relative to the countersunk screw 11.

Adjoining the tapped hole 12, the supporting body 2 has an enlarged bore portion 19 opening into the ball socket 4 and accommodating a compression spring 14 surrounding the countersunk screw 11 in ring-shape. The compression spring 14 shown in the drawing only as a fragment extends as far as into a bore portion 15 of the stepped bore 9 and bears with a spring force generated by bias against the supporting body 2 at its one end and against the swinging body 6 at its other end. The compression spring 14 urges the swinging body 6 with the shoulder 10 against the head of the countersunk screw 11 which is adjusted such as to cause the swinging body 6 to be unseated from the supporting body 2 and a gap to be produced between the bearing surfaces 5, 8.

Arranged in the supporting body 2 at a distance from the countersunk screw 11 is a locating pin 16 extending with a free end into the ball socket 4. The swinging body 6 has in the area of the locating pin 16 a locating bore 17 whose wall surrounds the locating pin 16 all-around with allowance for sufficient freedom of movement. The locating pin 16 aligns the swinging body 6 in its position relative to the supporting body 2, with the clearance between the locating pin 16 and the locating bore 17 being such as to enable the swinging body 6 to be accurately adjusted to the axial direction of the rotor.

On its side remote from the spherical cap 7, the swinging body 6 is provided with a wedge-shaped groove 18 with wall surfaces forming an obtuse angle with one another and defining the contact surface 20 for contact with the outer surface of a rotor. The angled arrangement of the areas of the contact surface 20 enables the swinging body 6 to align itself accurately relative to a cylindrical outer surface of a rotor, with both contact surfaces 20 touching the rotor along two lines.

FIG. 1 shows the counter-electrode 1 as lifted clear of a rotor. The swinging body 6 is held against the head 13 of the countersunk screw 11 by action of the compression spring 14, with the conical shapes of the head 13 and the shoulder 10 aligning it such that a gap of constant width is present between the bearing surfaces 5, 8.

In a welding device, the counter-electrode 1 is initially positioned above a rotor having its axis of rotation aligned normal to the drawing plane in such a way as to occupy above the rotor a position in which both areas of the contact surface 20 are equally spaced apart from the cylindrical outer surface of the rotor. The counter-electrode 1 is then advanced to the rotor in a direction radial thereto, with the contact surface 20 of the swinging body 6 making engagement with the rotor. With the advance movement continuing, the swinging body 6 detaches itself from the head of the countersunk screw 11, aligning itself by the action of the compression spring 14 relative to the rotor such that both areas of the contact surface 20 rest firmly against the rotor. As this occurs, the swinging body 6 compensates for inaccuracies in the positioning of the counter-electrode 1, the presence of the gap preventing any misalignment due to friction forces on the bearing surfaces 5, 8. With the counter-electrode 1 continuing its approach, the gap closes and the spherical bearing surfaces 5, 8 rest against each other without the previous alignment of the swinging body 6 being thereby altered. In this manner it is ensured that pressing forces and welding current are optimally transferred from the counter-electrode to the rotary body.

Figure 2:
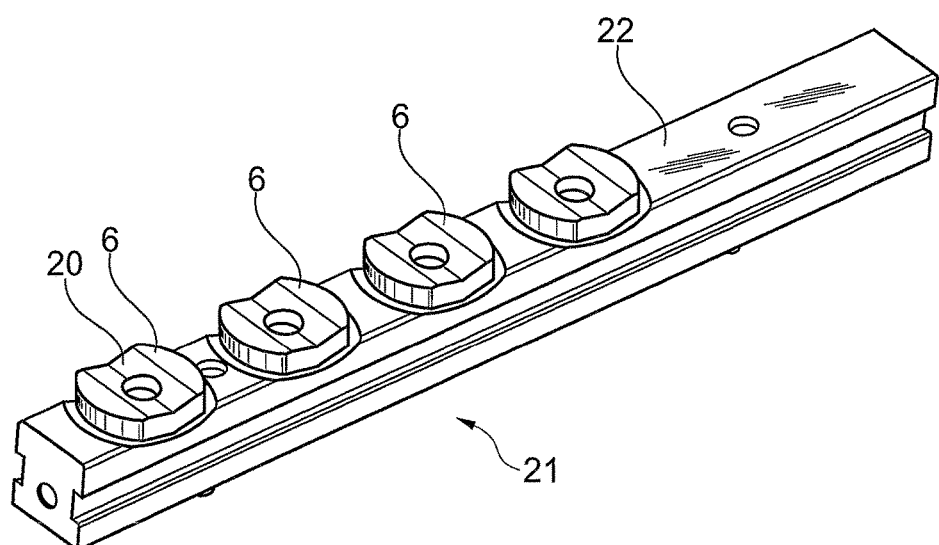
FIG. 2 is a perspective view of a counter-electrode of the invention including a plurality of swinging bodies.

FIG. 2 shows a counter-electrode 21 for a welding device which enables a plurality of corrective weights to be welded to a rotor in succession. The welding device includes a plurality of serially arranged holding electrodes which are put to use one after the other. Arranged opposite each holding electrode is a swinging body 6 which is secured to a rail 22 forming the supporting body in the same manner as shown in FIG. 1.

What is claimed is:

1. A device for attaching corrective weights to a cylindrical outer surface of a rotor via electric resistance pressure welding using a holding electrode receiving a corrective weight and a counter-electrode having a contact surface for application against the rotor,
    said counter-electrode and/or said holding electrode including a supporting body and a swinging body having oppositely facing, congruent, spherical bearing surfaces suitable for abutting engagement with each other,
    said swinging body being movably secured to the supporting body by a holding element such as to be able to perform limited swinging movements to all sides,
    with a spring arranged between the supporting body and the swinging body enabling a gap to be produced between the spherical bearing surfaces,
    with the swinging body having on the side facing away from the spherical bearing surface the contact surface for contact with the cylindrical outer surface of the rotor where the counter-electrode is concerned, and/or for contact with the corrective weight where the holding electrode is concerned,
    wherein the swinging body includes a central stepped bore radial relative to the spherical bearing surface and having a shoulder facing the contact surface, and
    wherein the holding element is a countersunk screw extending through the stepped bore with radial clearance all-around, said countersunk screw engaging into a tapped hole in the supporting body and enabling the shoulder to bear against its head.

2. The device according to claim 1, wherein the supporting body includes a ball socket and the swinging body a spherical cap which form the respective spherical bearing surfaces.

3. The device according to claim 1, wherein the contact surface of the swinging body of the counter-electrode is formed by wall surfaces of a wedge-shaped groove.

4. The device according to claim 1, wherein the contact surface of the swinging body of the holding electrode is formed by a cylindrical hollow surface.

5. The device according to claim 1, wherein the width of the gap between the bearing surfaces is adjustable via the countersunk screw.

6. The device according to claim 1, wherein the countersunk screw extends through an enlarged bore portion in the supporting body which adjoins the tapped hole and accommodates a compression spring surrounding the countersunk screw, its spring force enabling the swinging body to be unseated from the supporting body and to be urged against the head of the countersunk screw.

7. The device according to claim 1, wherein the supporting body includes a locating pin which is spaced from the countersunk screw and engages in a locating bore in the swinging body with allowance for radial play.

8. The device according to claim 1, wherein the supporting body is a rail which includes a plurality of ball sockets arranged one behind the other in longitudinal direction for movably receiving swinging bodies.

9. A system comprising:
    a swinging body comprising a disk having on its one side a spherical cap with a bearing surface and on its opposite side a contact surface and a central stepped bore, said contact surface being formed by the opposite plane wall surfaces of a wedge-shaped groove, the central stepped bore being radial relative to the bearing surface and having a shoulder facing the contact surface, and
    a countersunk screw having a head and extending through the central stepped bore with radial clearance all-around, said countersunk screw being configured to engage into a tapped hole in a supporting body, said head bearing against the shoulder of the central stepped bore.

10. The system according to claim 9, wherein the swinging body further comprises a locating bore which is spaced from the central stepped bore and has an opening on the side of the spherical cap, the locating bore being adapted to receive a locating pin with allowance for radial play.

* * * * *